(12) United States Patent  (10) Patent No.: US 9,137,676 B2
Nilsson et al.  (45) Date of Patent: Sep. 15, 2015

(54) METHODS IN A BASE STATION, COMPUTER PROGRAMS, COMPUTER PROGRAM PRODUCTS AND BASE STATION

(75) Inventors: Andreas Nilsson, Gothenburg (SE); Fredrik Athley, Kullavik (SE); Mikael Coldrey, Landvetter (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/114,701

(22) PCT Filed: Apr. 29, 2011

(86) PCT No.: PCT/EP2011/056881
§ 371 (c)(1),
(2), (4) Date: Oct. 29, 2013

(87) PCT Pub. No.: WO2012/146313
PCT Pub. Date: Nov. 1, 2012

(65) Prior Publication Data
US 2014/0073340 A1  Mar. 13, 2014

(51) Int. Cl.
H04W 72/00 (2009.01)
H04B 15/00 (2006.01)
H04B 1/04 (2006.01)
H04W 16/28 (2009.01)
H04W 72/04 (2009.01)

(52) U.S. Cl.
CPC ............ *H04W 16/28* (2013.01); *H04W 72/046* (2013.01)

(58) Field of Classification Search
CPC ........................................................ H04B 1/713
USPC ....................................................... 455/452.1
See application file for complete search history.

(56) References Cited

U.S. PATENT DOCUMENTS 6,104,930 A * 8/2000 Ward et al. .................... 455/450

FOREIGN PATENT DOCUMENTS

EP  0 876 074 A1  11/1998

* cited by examiner

*Primary Examiner* — Thomas Lett
(74) *Attorney, Agent, or Firm* — Rothwell, Figg, Ernst & Manbeck, P.C.

(57) ABSTRACT

The invention relates to a method in a base station serving a cell, the base station using a frequency bandwidth and comprising an antenna arrangement and a controller. The antenna arrangement comprises a number of antenna devices and a beamformer. The method comprises the steps of: associating, in the beamformer, at least a first and a second frequency band with a respective first and a second beam, each frequency band comprising a part of the frequency bandwidth used by the base station; dynamically determining, in the controller, a degree of utilization of the at least first and second frequency bands within the at least first and second beam; and re-associating, in the beamformer, the at least first and second frequency bands with the first and second beam, based on the determined degree of utilization of frequency bands. The invention also relates to base stations, computer programs and computer program products.

12 Claims, 4 Drawing Sheets

METHODS IN A BASE STATION, COMPUTER PROGRAMS, COMPUTER PROGRAM PRODUCTS AND BASE STATION

CROSS REFERENCE TO RELATED APPLICATION(S)

This application is a 35 U.S,C. §371 National Phase Entry Application from PCT/EP2011/056881, filed Apr. 29, 2011, designating the United States, the disclosure of which is incorporated herein in its entirety by reference.

FIELD OF THE INVENTION

The present invention relates generally to the field of wireless communication systems, and in particular to means and methods for reducing interference.

BACKGROUND OF THE INVENTION

There is an increasing demand for high data rates in wireless networks, the use of wireless broadband having increased rapidly during the last decade and expected to grow even faster in the near future. To meet this demand, network operators must increase the capacity in their communication systems, which is a challenging task. The existing communication systems should preferably be evolved in a cost and time efficient manner so as to meet the requirements for higher data rates. In this respect, a number of approaches are possible. One option is to deploy more base stations and use smaller cells. However, with many small cells and dense deployment of base stations, interference between different cells will most likely increase. The large number of base stations further gives a high energy consumption entailing high costs and influencing the environment in a negative way. Further still, costs and delays associated with installation of base stations may be significant. The output power of the base stations should therefore be limited to highest possible extent.

From the above, it is clear that it is a challenging task to increase the capacity in the communication system in order to be able to provide the desired services to the users, while taking into account aspects such as requirements for energy efficiency, costs and interference. There is thus room for improvements in this regards within this field of technology.

SUMMARY OF THE INVENTION

It is an object of the invention to meet the above challenges by providing methods and devices for enabling the reduction of power used by base stations while at the same time avoiding deterioration of system performance due to interference.

The object is according to a first aspect of the invention achieved by a method in a base station serving a cell, the base station using a frequency bandwidth and comprising an antenna arrangement and a controller. The antenna arrangement comprises a number of antenna elements and a beamformer. The method comprises the steps of: associating, in the beamformer, at least a first and a second frequency band with a respective first and a second beam, each frequency band comprising a part of the frequency bandwidth used by the base station; dynamically determining, in the controller, a degree of utilization of the at least first and second frequency bands within the at least first and second beam; and re-associating, in the beamformer, the at least first and second frequency bands with the first and second beam, based on the determined degree of utilization of frequency bands.

By means of the invention, increased gain towards user equipment is obtained, which can be used to reduce output power of both the base station as well as the user equipment. This also reduces inter-cell interference. An increased performance of the whole communication system is also obtained owing to the reduced interference levels.

In an embodiment, the step of dynamically determining the degree of utilization of frequency bands comprises determining if there is un-used frequency spectrum in any of the at least first and second frequency bands and determining if all available frequency spectrum of any of the at least first and second frequency bands is used.

In an embodiment, the step of re-associating comprises associating at least a part of un-used frequency spectrum in any of the at least first and second frequency bands with a beam, the frequency band of which is fully utilized. An efficient way of using the available frequency bandwidth allocated to a particular base station is provided. In particular, frequency spectrum allocated for use in a part of the coverage area of the base station is not fully used, is instead used in parts of the coverage area needing more capacity.

In an embodiment, the step of re-associating comprises associating at least a part of un-used frequency spectrum in any of the at least first and second frequency bands with a beam, the frequency band of which is fully utilized and de-associating the un-used frequency spectrum from the beam with which it is presently associated.

In an embodiment, the step of associating, in the beamformer, at least a first and a second frequency band with a respective first and a second beam, comprises associating equal amount of the frequency bandwidth used by the base station to each of the at least first and second frequency bands.

In an embodiment, at least a first, second and third frequency band are associated with a respective first, second and third beam, wherein one of the first, second and third beam is covering the whole cell and wherein control signaling is transmitted on the frequency band of the beam covering the whole cell. In another embodiment, control signaling is transmitted in a frequency band f1 for all beams.

In an embodiment, the at least first and second beams together provide coverage of the whole cell.

In an embodiment, the steps of dynamically determining and re-associating are repeated regularly or continuously.

In an embodiment, the beamformer comprises a digital beamformer. The use of a digital beamformer provides a flexible, easily configurable and re-configurable means for obtaining the desired beams. In another embodiment, the beamformer comprises an analog beamformer comprising a Butler or a Blass matrix connected to a frequency demultiplexer. Design flexibility is thus provided, enabling the use of suitable means depending on the need in the particular application.

The object is according to a second aspect of the invention achieved by a computer program for dynamic frequency allocation in a base station serving a cell, the base station using a frequency bandwidth. The computer program comprises computer program code which when run on the base station causes the base station to: associate at least a first and a second frequency band with a respective first and a second beam, each frequency band comprising a part of the frequency bandwidth used by the base station; dynamically determine a degree of utilization of the at least first and second frequency bands within the at least first and second beam; and re-associate the at least first and second frequency bands with the first and second beam, based on the determined degree of utilization of frequency bands.

The object is according to a third aspect of the invention achieved by a computer program product comprising a computer program as above, and computer readable means on which the computer program is stored.

The object is according to a fourth aspect of the invention achieved by a base station for dynamic frequency allocation, the base station serving a cell and using a frequency bandwidth. The base station is arranged to: associate at least a first and a second frequency band with a respective first and a second beam, each frequency band comprising a part of the frequency bandwidth used by the base station; dynamically determine a degree of utilization of the at least first and second frequency bands within the at least first and second beam; and re-associate the at least first and second frequency bands with the first and second beam, based on the determined degree of utilization of frequency bands.

Further features and advantages thereof will become clear upon reading the following description and the accompanying drawings.

DETAILED DESCRIPTION OF EMBODIMENTS

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail. Like numbers refer to like elements throughout the description.

One way to increase the capacity within a communication network is to use so-called smart antennas in the base stations. Smart antennas are antenna arrays with smart signal processing algorithms, the antenna for example comprising several antenna elements the settings of which changes the characteristics of the smart antenna. For example, changing phase settings of the individual antenna elements will change the radiation pattern of the smart antenna.

An interesting implementation of smart antennas comprises active antennas. "Active antennas" basically means that the radio is integrated with the antenna. This gives the opportunity to change the characteristics of the smart antenna in digital domain, with a so called digital beamformer. There are several advantages with changing the beams of the reconfigurable smart antennas with digital beamformer instead of using for example analog phase shifters. One advantage is that the change of the beam of the smart antenna could be changed fast and another advantage is that it is possible to change the beams differently for different frequencies. In an embodiment, the present invention makes use of such smart antennas.

Figure 1:
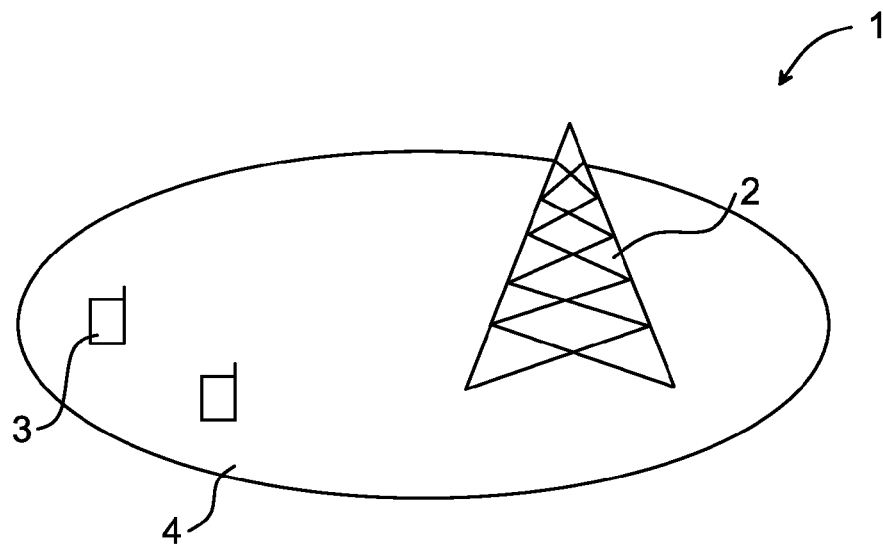
FIG. 1 illustrates schematically an environment in which embodiments of the invention may be implemented.

FIG. 1 illustrates schematically an environment in which embodiments of the invention may be implemented. A communication system 1, e.g. utilizing LTE Advanced standard, comprises a base station 2 serving a cell 4 having a certain coverage area. User equipment 3 located within the coverage area are provided with services from the base station 2, services such as data or voice traffic. The communication system 1 typically comprises many such cells and base stations, and may comprise a layered structure, e.g. Heterogeneous network, wherein further base stations are located within the coverage area of the illustrated base station 2.

Figure 2:
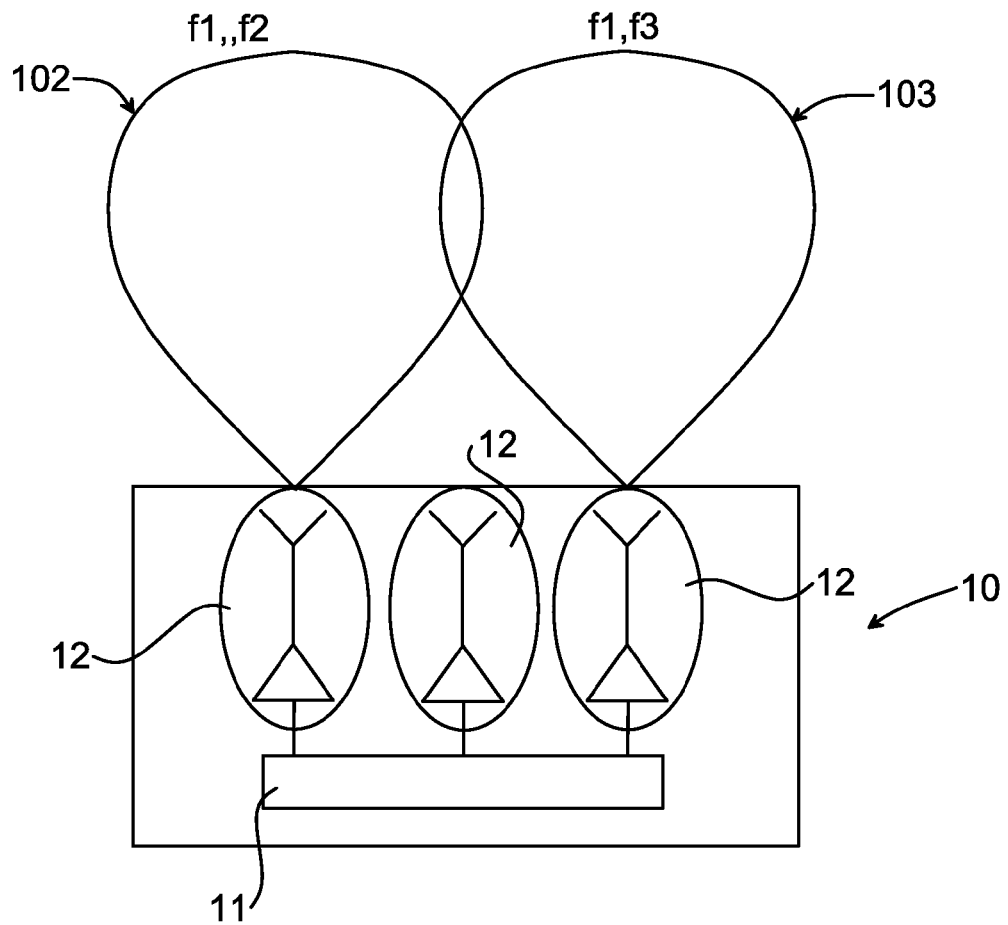
FIG. 2 illustrates a an antenna arrangement for use in a first embodiment of an aspect of the invention in its most basic form.

FIG. 2 illustrates a first embodiment of the invention, in its most basic design. An antenna arrangement 10 is provided for use in the base station 2 and enables dynamic frequency allocation for fixed beam systems. The antenna arrangement 10 comprises a beamformer and antenna devices 12. The antenna devices 12 may be active, each comprising an antenna element and a power amplifier or only antenna elements such as in a passive antenna.

The antenna arrangement 10 comprises a beamformer 11, for example a digital beamformer or an analog beamformer. The beamformer 11 is used for enabling the transmission of different frequency bands f1, f2, f3 in different beams 102, 103. The base station 2 is allocated a particular frequency bandwidth f for use in communication with the user equipment 3. Such frequency allocation is typically performed on a system level, and could comprise the entire frequency bandwidth used in the communication system 1 or parts thereof.

A part of this total frequency bandwidth f used in the base station 2 is used for transmitting broadcast signals, the part being denoted first frequency band f1. The first frequency band f1 should cover the whole cell, which coverage can be accomplished in different ways. The traffic data (user data), pilot signals etc. is transmitted in second and third frequency bands f2 and f3.

Figure 3:
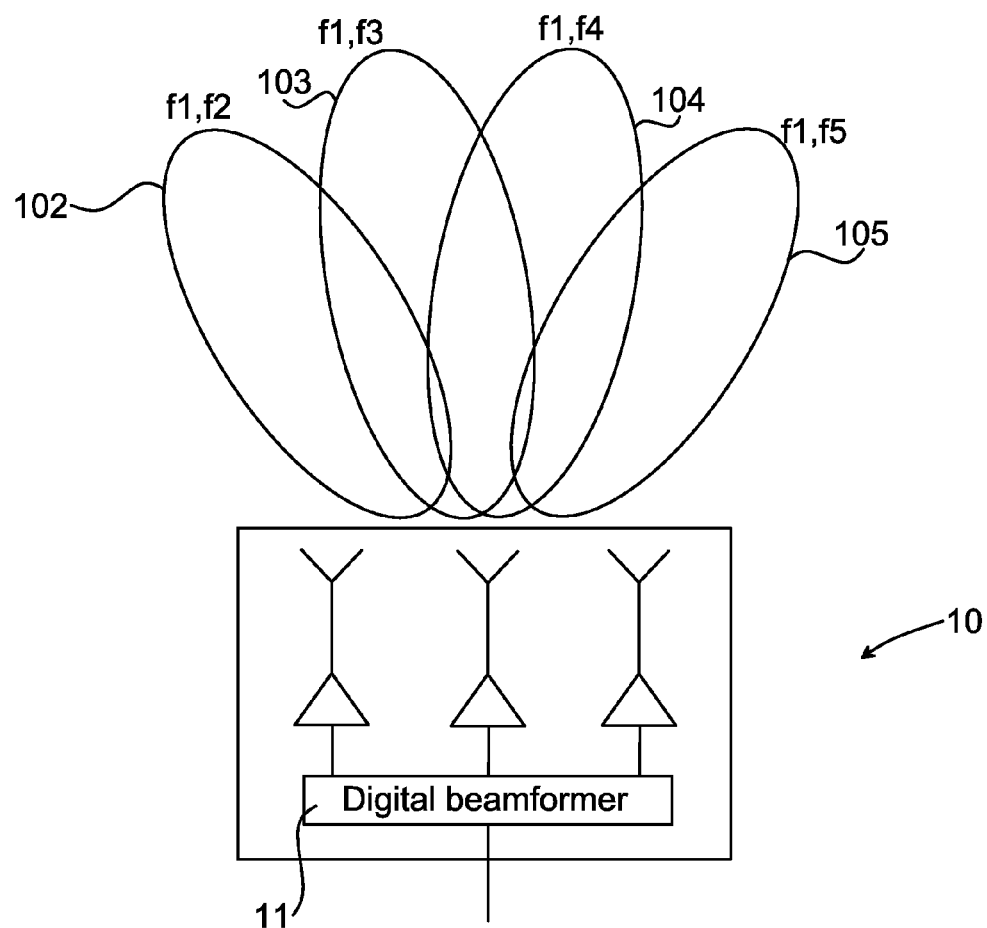
FIG. 3 illustrates an antenna arrangement for use in a second embodiment of an aspect of the invention.

FIG. 3 illustrates the antenna arrangement 10 of FIG. 2, but with a larger number of narrow beams 102, 103, 104, 105 and wherein the total frequency bandwidth f allocated to the base station 2 is divided into several frequency bands f1, f2, f3, f4, f5. As above, frequency band f1 is transmitted for all narrow beams 102, 103, 104, 105, while the first, second, third and fourth f2, f3, f4, f5 frequency bands are each transmitted for one of the narrow beams. The four narrow beams 102, 103, 104, 105 together cover the whole cell 4 for enabling services to be provided to user equipment located anywhere within coverage range of the base station 2.

Figure 4:
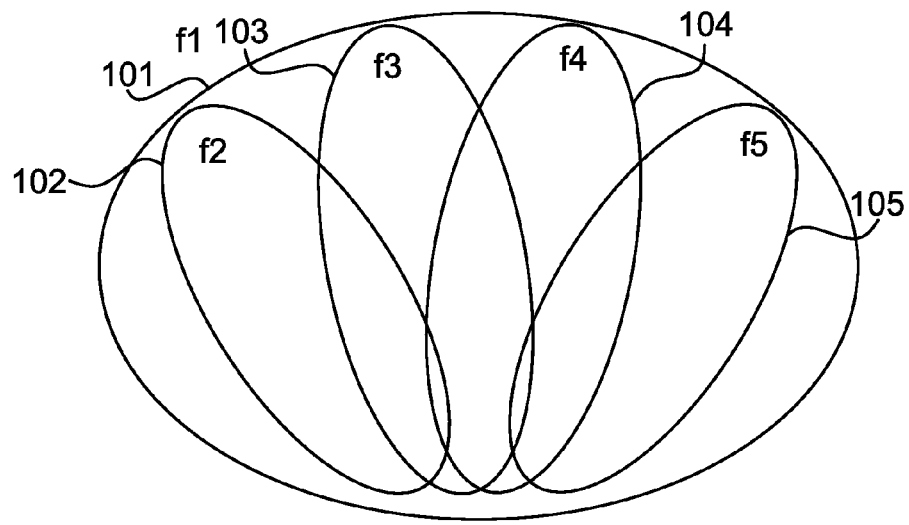
FIG. 4 illustrates an antenna arrangement for use in a third embodiment of an aspect of the invention.

In the case illustrated in FIG. 3 the first frequency band f1, on which broadcast signals are transmitted, covers the entire cell 4 by being transmitted in all the narrow beams 102, 103, 104, 105. Another way of covering the whole cell is illustrated in FIG. 4. The first frequency band f1 is sent on one wide beam 101 instead of on the four narrow beams 102, 103, 104, 105, thus covering the whole cell 4.

The size of the respective frequency bands f2, f3, f4, f5 can be changed dynamically depending on the amount of traffic, i.e. depending on the required capacity. Each beam 102, 103, 104, 105 covers a certain part of the cell 4, and depending e.g. on the number of users or capacity required in respective part, the bandwidth transmitted on the corresponding beam can be increased or decreased. For example, if there is a lot of traffic in the second narrow beam 102, using second frequency band f2, then the second frequency band f2 can be increased, enabling all the traffic to be served. A method for dynamically allocating different amount of frequency spectrum in the different frequency bands f2, f3, f4, f5 will be described later with reference to FIGS. 7 and 8.

Figure 5:
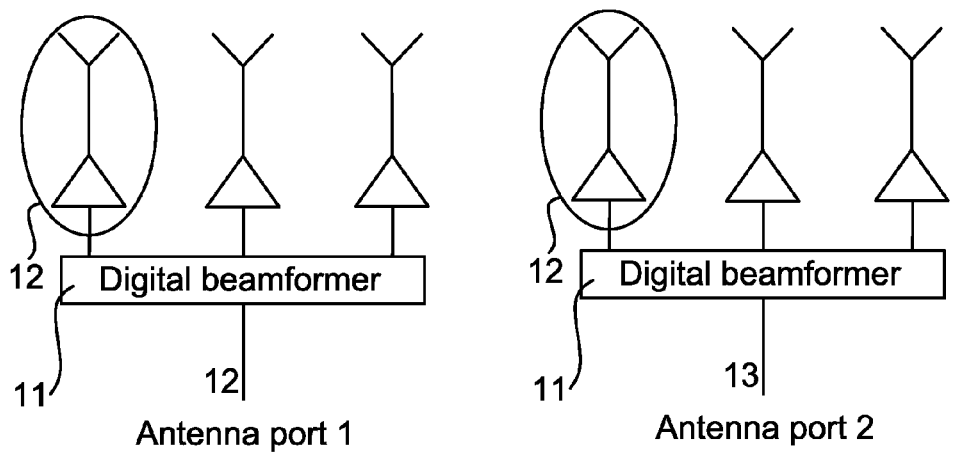
FIG. 5 illustrates an architecture for an antenna arrangement for use in a base station.

FIG. 5 illustrates an architecture for an antenna arrangement for use in a base station. The antenna arrangement comprises two antenna ports 12, 13 to a respective digital beamformer 11 in turn connected to a number of antenna devices 12. This architecture supports 2×2 MIMO (number of transmit antennas x number of receive antennas, Multiple Input Multiple Output) owing to the two antenna ports. If the antenna elements of the antenna device are dual-polarized, this architecture would support up to 4×4 MIMO.

Figure 6:
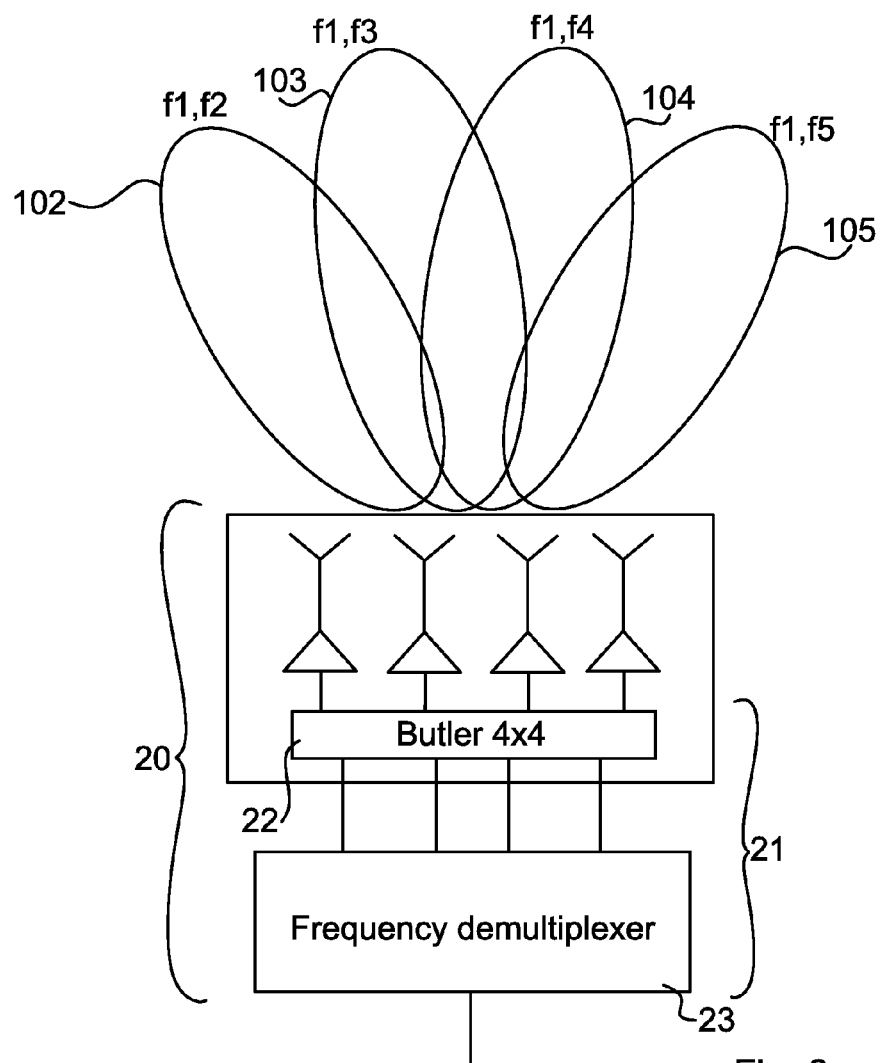
FIG. 6 illustrates a fourth embodiment of an aspect of the invention.

FIG. 6 illustrates a fourth embodiment of an aspect of the invention. In this embodiment, the beamformer 21 comprises an analog beamformer. Such analog beamformer 21 could be designed using a Butler matrix or a Blass Matrix connected to a frequency demultiplexer 23 that dynamically allocates different frequencies to different beams. The mentioned Butler and Blass matrices are only exemplary analog distribution networks, and yet other such analog distribution networks could alternatively be used.

Figure 7:
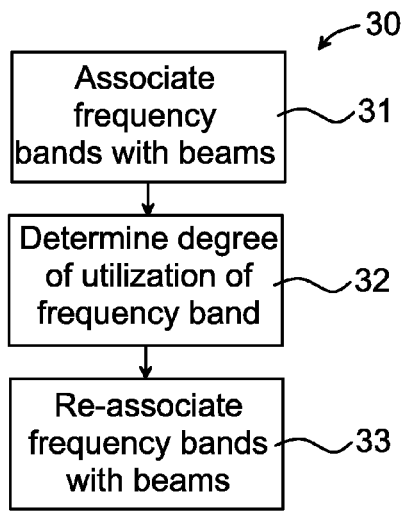
FIG. 7 illustrates a flow chart over steps of a method in accordance with an aspect of the invention.

FIG. 7 illustrates a flow chart over steps of a method in accordance with an aspect of the invention. The method 30 enables dynamic allocation of frequencies to different beams.

The method 30 comprises the first step of associating 31, in the beamformer 11, 21, different frequency bands f2, f3, f4, f5 with a respective beam 102, 103, 104, 105, wherein each frequency band f2, f3 comprises a part of the frequency bandwidth f used by the base station 1, as described earlier. The number of frequency bands is set suitably in dependence on need, but is at least two. An equal amount of the total frequency bandwidth used by the base station 2 can be associated with each of the frequency bands f2, f3, f4, f5. For example, in a base station having 100 MHz frequency bandwidth, and wherein the cell coverage is provided by four beams, each beam could initially be associated with a 20 MHz bandwidth (f1=20 MHz, f2=20 MHz, f3=20 MHz, f4=20 MHz, f5=20 MHz). It is realized that the frequency bandwidth associated with the respective beams could be chosen in different ways depending on the communication system at hand and/or on the traffic situation in the cell to be covered or based on other considerations.

The method 30 comprises the second step of dynamically determining 32, e.g. in a controller 40 arranged in the base station 1, a degree of utilization of the frequency bands f2, f3, f4, f5 within the beams 102, 103, 104, 105. The degree of utilization of frequency bands may comprise determining if there is un-used frequency spectrum in any of the frequency bands f2, f3, f4, f5 and determining if all available frequency spectrum of any of the frequency bands f2, f3, f4, f5 is used.

The method 30 comprises the third step of re-associating 33, in the beamformer 11, 21, the frequency bands f2, f3, f4, f5 with the respective beams 102, 103, 104, 105 based on the degree of utilization of frequency bands f2, f3, f4, f5 as determined in the previous step. The step of re-associating 33 may comprise associating at least a part of any un-used frequency spectrum in any of the frequency bands f2, f3, f4, f5 with a beam, the frequency band of which is fully utilized. This step then also preferably comprises de-associating the un-used frequency spectrum from the beam with which it is presently associated. For example, if the third frequency band f3 is only partly used, and the second frequency band f2 is fully used, then part of the frequency spectrum of the third frequency band f3 is moved from the third beam 103 to the second beam 102.

The steps of dynamically determining 32 and re-associating 33 may be repeated regularly or continuously, i.e. repeating the steps with certain time periods or continuously.

Figure 8:
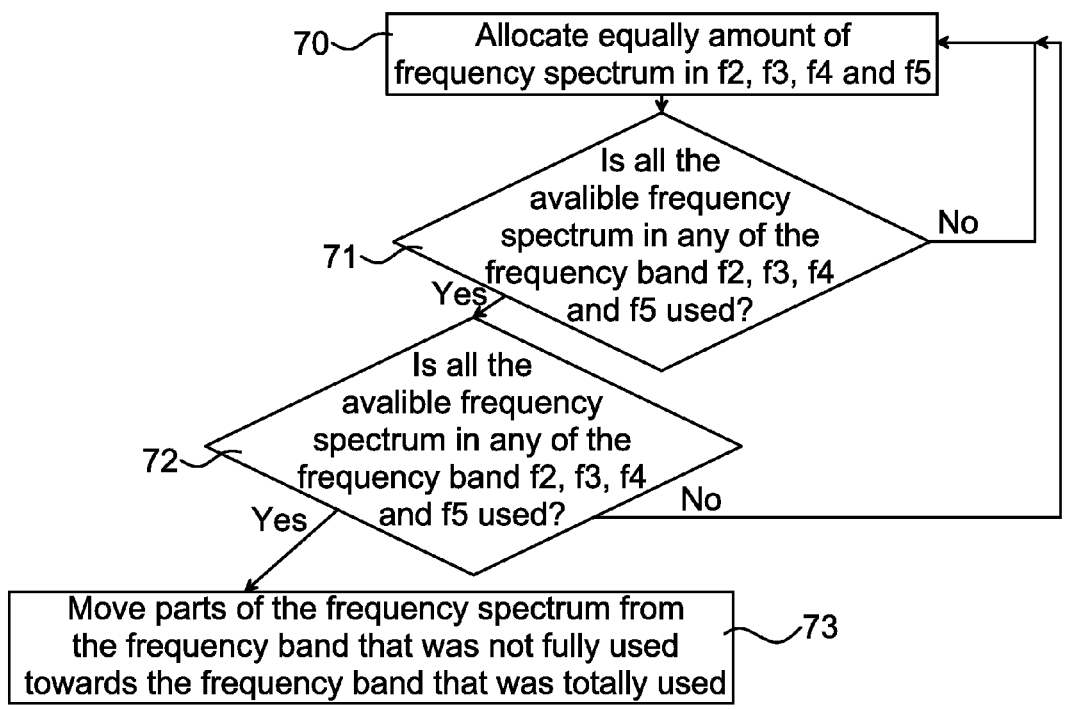
FIG. 8 illustrates another flow chart over steps of a method in accordance with an aspect of the invention.

The above method is illustrated in another flow chart in FIG. 8. At box 70 an equal amount of the frequency bandwidth f is allocated in the frequency bands f2, f3, f4, f5. Then in box 71 it is established whether all available frequency spectrum in any of the frequency bands f2, f3, f4, f5 is used. If none of the frequency bands f2, f3, f4, f5 are fully used, this step 71 is repeated after a certain time period. If one or more of the frequency bands f2, f3, f4, f5 is indeed fully used, then, in box 72, it is checked whether there is any un-used frequency spectrum in any of the other frequency bands f2, f3, f4, f5. If no, then the method again returns to box 71. If one or more of the frequency bands f2, f3, f4, f5 do have un-used frequency spectrum, then, at box 73, parts of the frequency spectrum from the frequency band that is not fully used is moved towards the frequency band that was fully used. The steps may be repeated again after some time or if need for it is detected.

Figure 9:
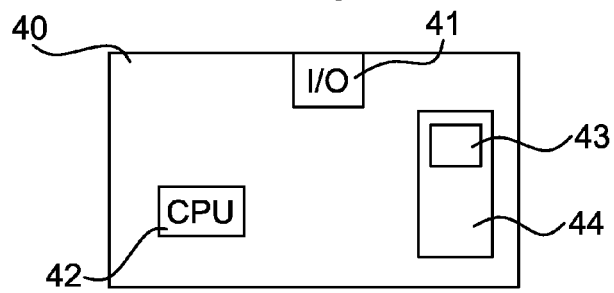
FIG. 9 illustrates means in a base station for implementing methods in accordance with the invention.

FIG. 9 illustrates means for implementing the described methods, and in particular a controller 40 for use in the base station 2 enabling the dynamic frequency allocation. The controller 40 comprises a processor 42, e.g. a central processing unit, microcontroller, digital signal processor (DSP), etc., capable of executing software instructions stored in a computer program product 43 e.g. in the form of a memory. The processor 42 is connected to an input device 41 that receives inputs from user equipment 3, typically via some other device, e.g. a transceivers, of the base station 2. It is noted that although only one processor 42 is illustrated in FIG. 9, the implementation may comprise distributed hardware so that several CPUs are used rather than one when running the software.

The described methods and algorithms or parts thereof for dynamic frequency allocation may be implemented e.g. by software and/or application specific integrated circuits in the controller 40. To this end, the base station may further comprise a computer program 43 stored on a computer program product 44.

With reference still to FIG. 9, the invention also encompasses such computer program 43 for dynamic frequency allocation. The computer program 43 comprises computer program code which when run on the base station 2, and in particular the processor 42 thereof, causes the base station 2 to perform the methods as described.

A computer program product 44 is also provided comprising the computer program 43 and computer readable means on which the computer program 43 is stored. The computer program product 44 can be any combination of read and write memory (RAM) or read only memory (ROM). The computer program product 44 may also comprise persistent storage, which, for example can be any single one or combination of magnetic memory, optical memory, or solid state memory.

The invention also encompasses the base station 2 for dynamic frequency allocation, the base station 2 serving the cell 4 and using a frequency bandwidth f, as described earlier. The base station 1 is arranged to perform the methods as described.

The invention claimed is:

1. A method in a base station serving a cell, the base station using a frequency bandwidth and comprising an antenna arrangement and a controller, the antenna arrangement comprising a number of antenna devices and a beamformer, the method comprising the steps of:

associating, in the beamformer, at least a first and a second frequency band with a respective first and a second beam, each frequency band comprising a part of the frequency bandwidth used by the base station, dynamically determining, in the controller, a degree of utilization of the at least first and second frequency bands within the at least first and second beam, and re-associating, in the beamformer, the at least first and second frequency bands with the first and second beam, based on the determined degree of utilization of the at least first and second frequency bands, such that at least a part of un-used frequency spectrum in any of the at least first and second frequency bands is associated with a beam having a frequency band that is fully utilized and the un-used frequency spectrum is disassociated from the beam with which it is presently associated.

2. The method as claimed in claim 1, wherein the step of dynamically determining the degree of utilization of the at least first and second frequency bands comprises determining if there is un-used frequency spectrum in any of the at least first and second frequency bands and determining if all available frequency spectrum of any of the at least first and second frequency bands is used.

3. The method as claimed in claim 1, wherein the step of associating, in the beamformer, at least a first and a second frequency band with a respective first and a second beam, comprises associating an equal amount of the frequency bandwidth used by the base station to each of the at least first and second frequency bands.

4. The method as claimed in claim 1, wherein at least a first, second and third frequency band are associated with a respective first, second and third beam, wherein one of the first, second and third beam is covering the whole cell and wherein control signaling is transmitted on the frequency band of the beam covering the whole cell.

5. The method as claimed in claim 1, wherein control signaling is transmitted in a frequency band for all beams.

6. The method as claimed in claim 1, wherein the at least first and second beams together provide coverage of the whole cell.

7. The method as claimed in claim 1, wherein the steps of dynamically determining and re-associating are repeated regularly or continuously.

8. The method as claimed in claim 1, wherein the beamformer comprises a digital beamformer.

9. The method as claimed in claim 1, wherein the beamformer comprises an analog beamformer comprising a Butler matrix or Blass Matrix connected to a frequency demultiplexer.

10. A non-transitory computer program for dynamic frequency allocation in a base station serving a cell, the base station using a frequency bandwidth and comprising an antenna arrangement and a controller, the antenna arrangement comprising a number of antenna devices and a beamformer, the computer program comprising computer program code which when run on the base station causes the base station to:

associate at least a first and a second frequency band with a respective first and a second beam, each frequency band comprising a part of the frequency bandwidth used by the base station, dynamically determine a degree of utilization of the at least first and second frequency bands within the at least first and second beam, and re-associate the at least first and second frequency bands with the first and second beam, based on the determined degree of utilization of the at least first and second frequency bands, such that at least a part of un-used frequency spectrum in any of the at least first and second frequency bands is associated with a beam having a frequency band that is fully utilized and the un-used frequency spectrum is disassociated from the beam with which it is presently associated.

11. A computer program product comprising a computer program for dynamic frequency allocation in a base station serving a cell, the base station using a frequency bandwidth and comprising an antenna arrangement and a controller, the antenna arrangement comprising a number of antenna devices and a beamformer, the computer program comprising computer program code which when run on the base station causes the base station to:

associate at least a first and a second frequency band with a respective first and a second beam, each frequency band comprising a part of the frequency bandwidth used by the base station, dynamically determine a degree of utilization of the at least first and second frequency bands within the at least first and second beam, and re-associate the at least first and second frequency bands with the first and second beam, based on the determined degree of utilization of the at least first and second frequency bands, such that at least a part of un-used frequency spectrum in any of the at least first and second frequency bands is associated with a beam having a frequency band that is fully utilized and the un-used frequency spectrum is disassociated from the beam with which it is presently associated; and a non-transitory computer readable medium on which the computer program is stored.

12. A base station for dynamic frequency allocation, the base station serving a cell and using a frequency bandwidth, wherein the base station comprises an antenna arrangement and a controller, the antenna arrangement comprising a number of antenna devices and a beamformer, the base station configured to:

associate at least a first and a second frequency band with a respective first and a second beam, each frequency band comprising a part of the frequency bandwidth used by the base station, dynamically determine a degree of utilization of the at least first and second frequency bands within the at least first and second beam, and re-associate the at least first and second frequency bands with the first and second beam, based on the determined degree of utilization of the at least first and second frequency bands, such that at least a part of un-used frequency spectrum in any of the at least first and second frequency bands is associated with a beam having a frequency band that is fully utilized and the un-used frequency spectrum is disassociated from the beam with which it is presently associated.

* * * * *